No. 712,725. Patented Nov. 4, 1902.
J. H. RUSBY.
KNUCKLE JOINT.
(Application filed Dec. 16, 1901.)
(No Model.)

WITNESSES:
William A. Miller
Chas. E. P. Ensgen

INVENTOR
Joseph H. Rusby
BY W. C. Hauff
ATTORNEY

UNITED STATES PATENT OFFICE.

JOSEPH H. RUSBY, OF NUTLEY, NEW JERSEY.

KNUCKLE-JOINT.

SPECIFICATION forming part of Letters Patent No. 712,725, dated November 4, 1902.

Application filed December 16, 1901. Serial No. 86,183. (No model.)

*To all whom it may concern:*

Be it known that I, JOSEPH H. RUSBY, a citizen of the United States, residing at Nutley, in the county of Essex and State of New Jersey, have invented new and useful Improvements in Knuckle-Joints, of which the following is a specification.

This invention relates to a knuckle-joint which can be made without any rivet or pin; and the invention resides in the novel features set forth in the following specification and claims and illustrated in the annexed drawings, in which—

Figure 1:
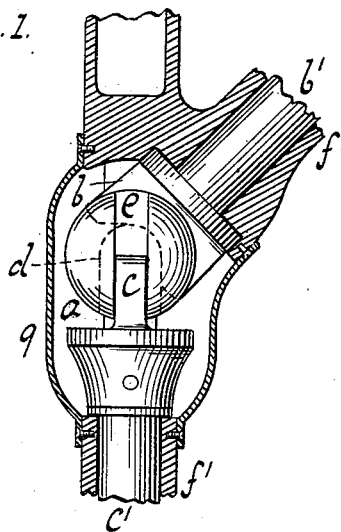
Figure 2:
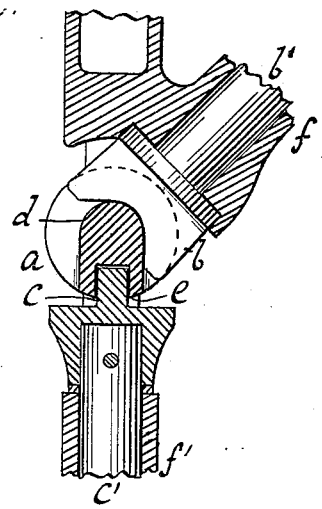
Figure 3:
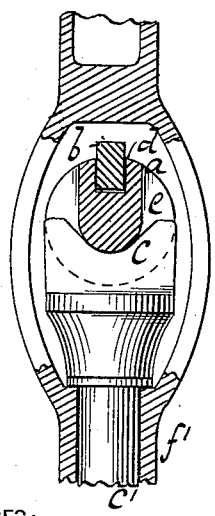
Figure 4:
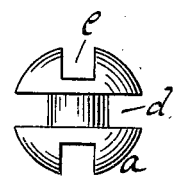
Figure 5:
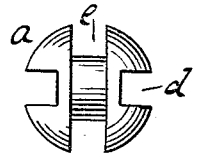

Figure 1 shows the ball of the knuckle-joint as applied to use, the bearing being sectioned to expose the ball and forks. Fig. 2 is a section through one groove of the ball. Fig. 3 is a section through the other groove of the ball. Fig. 4 shows the terminating walls of one groove in the ball. Fig. 5 shows the terminating walls of the other groove in the ball.

This knuckle-joint can be formed without any rivets or pins. The joint portions or bearing-surfaces can be suitably hardened to prevent or resist wear. It may also be noted that the joint requires but three pieces, so as to be simple of construction.

In the drawings the joint is shown comprising a ball and forks. The ball is shown at $a$ and two forks at $b$ and $c$. The ball has seats $d$ and $e$ for the forks. The ball and forks are made to loosely or separately engage one another. In other words, these parts are not pinned or connected, but simply sit together, so that the rotation of either fork is communicated to the ball and to the other fork. A bearing is shown at $ff'$. This bearing is made to hold the joint parts in engagement or against separation. The fork-seats in the ball are formed by grooves of suitable depth. These grooves are shown extended only part way about the ball, being of course of large enough arc to allow the required mounting and play of the forks. It has been found that a seat extending only part way around or leaving the ball partly complete or uncut leaves the ball comparatively stronger, so that for heavy strain or machinery a ball only partly cut is considered preferable.

The forks $b$ and $c$ are formed with or secured to shafts $b'$ and $c'$. Each shaft can be cast or made integral with its fork, and such shafts can also be formed in several sections or lengths or connected to required parts, as called for.

The bearing $ff'$ can be in one piece or in several pieces.

A cover 9 can be applied over the joint, so as to protect the latter and also prevent the fingers of the user or workman accidentally getting caught in the joint. Such cover, however, can be omitted, if desired.

The ball $a$, as noted, is shown with partial grooves at an angle to one another or having the grooves partitioned off, as seen by the partial groove $e$ in Fig. 4 and the partial groove $d$ in Fig. 5. Such terminating wall of grooves $d$ $e$ not only strengthens the ball, so that it can bear heavy strain, but also prevents grit or other matter being created or worked across from one groove into another, whereby friction or difficulty might be caused.

What I claim as new, and desire to secure by Letters Patent, is—

1. A knuckle-joint comprising a ball and forks, said ball having peripheral grooves for the engagement of the forks and said grooves being partitioned from one another or extended only part way about the ball.

2. A knuckle-joint comprising a ball and forks said ball having fork-engaging peripheral grooves placed at an angle to and not crossing one another.

In testimony whereof I have hereunto set my hand in the presence of two subscribing witnesses.

JOSEPH H. RUSBY.

Witnesses:
CHAS. E. POENSGEN,
E. F. KASTENHUBER.